US012604974B2

(12) United States Patent  (10) Patent No.:   US 12,604,974 B2
Ye et al.  (45) Date of Patent:    Apr. 21, 2026

(54) LIFTING COLUMN

(71) Applicant: NINGBO HEALTHKEY MOTION TECHNOLOGY CO., LTD., Cixi City (CN)

(72) Inventors: Dongtong Ye, Cixi City (CN); Xuliang Gong, Cixi City (CN); Zhuangyan Rong, Cixi City (CN); Junsheng Zhang, Cixi City (CN)

(73) Assignee: NINGBO HEALTHKEY MOTION TECHNOLOGY CO., LTD., Ningbo (CN)

( * ) Notice:   Subject to any disclaimer, the term of this patent is extended or adjusted under 35 U.S.C. 154(b) by 535 days.

(21) Appl. No.:   18/271,303

(22) PCT Filed:   Apr. 24, 2022

(86) PCT No.:   PCT/CN2022/088649
§ 371 (c)(1),
(2) Date:   Jul. 7, 2023

(87) PCT Pub. No.:   WO2022/242423
PCT Pub. Date: Nov. 24, 2022

(65) Prior Publication Data
US 2026/0101994 A1    Apr. 16, 2026

(30) Foreign Application Priority Data

May 21, 2021    (CN) .......................... 202110558666.9

(51) Int. Cl.
*A47B 13/02*    (2006.01)
*F16B 12/38*    (2006.01)
(52) U.S. Cl.
CPC ............ *A47B 13/021* (2013.01); *F16B 12/38* (2013.01); *A47B 2200/0029* (2013.01)

(58) Field of Classification Search
CPC ........... A47B 13/021; A47B 2200/0029; F16B 12/38
(Continued)

(56) References Cited

U.S. PATENT DOCUMENTS

| 5,037,232 A * | 8/1991 | Pakdipanichpong ..... B60P 3/36 |
| | | 108/150 |
| 5,926,915 A * | 7/1999 | Chou ................... A45C 13/262 |
| | | 190/115 |
| 12,398,575 B2 * | 8/2025 | Ding ...................... F16B 9/052 |

FOREIGN PATENT DOCUMENTS

| CN | 200947910 Y | 9/2007 |
| CN | 108903401 A | 11/2018 |
(Continued)

OTHER PUBLICATIONS

Jul. 1, 2022 International Search Report issued in International Patent Application No. PCT/CN2022/088649.
(Continued)

*Primary Examiner* — Todd M Epps
(74) *Attorney, Agent, or Firm* — Oliff PLC

(57)    ABSTRACT
A lifting column, including: a column body and a foot, an insert-joint assembly being provided at the bottom of the column body, a snap groove being provided on the insert-joint assembly, the foot including a base and an insert-joint socket, a receptacle configured to receive the insert-joint assembly and an elastic snap-fit assembly disposed at a lower portion of the receptacle being provided on the insert-joint socket, a guide bevel being further provided on the insert-joint assembly; on insert-fitting between the insert-joint assembly and the receptacle, the elastic snap-fit assembly is compressed by the guide bevel, and after the insert-joint assembly is mounted in place, the elastic snap-fit assembly is snap-fitted in the snap groove to thereby secure the column body to the foot.

8 Claims, 5 Drawing Sheets

(58) Field of Classification Search
USPC ......................................................... 248/188
See application file for complete search history.

(56) References Cited

FOREIGN PATENT DOCUMENTS

| CN | 110477600 | A | 11/2019 |
|----|-----------|---|---------|
| CN | 209694396 | U | 11/2019 |
| CN | 112315186 | A | 2/2021 |
| CN | 113317617 | A | 8/2021 |
| WO | 2015/180723 | A1 | 12/2015 |
| WO | 2021/041680 | A1 | 3/2021 |

OTHER PUBLICATIONS

Nov. 21, 2023 International Preliminary Report on Patentability issued in International Patent Application No. PCT/CN2022/088649.
Jun. 14, 2024 extended Search Report issued in European Patent Application No. 22803747.9.

\* cited by examiner

A

LIFTING COLUMN

FIELD

The disclosure pertains to the field of lifting arrangements, and more particularly relates to a lifting column.

BACKGROUND

At present, a lifting column for a conventional height adjustable desk is usually secured to a corresponding foot via a fastener such as a screw; this assembly manner is troublesome to a terminal user. The complicated and inconvenient assembly process degrades user experience.

SUMMARY

To address at least one of the technical problems noted above, a lifting column is provided.

In some embodiments, a lifting column comprises: a column body and a foot mounted to a lower portion of the column body, an insert-joint assembly is provided at the bottom of the column body, a snap groove is provided on the insert-joint assembly, the foot comprises a base and an insert-joint socket provided on the base, a receptacle configured to receive the insert-joint assembly and an elastic snap-fit assembly disposed at a lower portion of the receptacle are provided on the insert-joint socket, a guide bevel disposed at a lower portion of the snap groove is further provided on the insert-joint assembly, wherein on insert-fitting between the insert-joint assembly and the receptacle, the elastic snap-fit assembly is compressed by the guide bevel, and after the insert-joint assembly is mounted in place, the elastic snap-fit assembly is snap-fitted in the snap groove to thereby secure the column body to the foot.

In some embodiments, the elastic snap-fit assembly comprises two snap-fit rods slidably attached on the insert-joint socket and an elastic member disposed between the two snap-fit rods, such that after the insert-joint assembly is mounted in place, the snap-fit rods are pushed by the elastic member and snap-fitted into the snap groove.

In some embodiments, a slide groove disposed at either side of the receptacle and communicating with the receptacle is provided at the bottom of the insert-joint socket, and two ends of each of the snap-fit rods extend into the slide groove so as to abut against the elastic member in the slide groove.

In some embodiments, a mounting groove is further provided in the slide groove, and the elastic member is partially disposed in the mounting groove.

In some embodiments, a cover plate is removably attached onto the insert-joint socket, and the cover plate covers the bottom of the slide groove.

In some embodiments, two snap hooks are symmetrically provided at the bottom of the insert-joint assembly, and the snap groove is disposed at either opposite side of the two snap hooks.

In some embodiments, an insert-fit rib is vertically provided on an outer sidewall of the insert-joint assembly, and a slot is provided on an inner wall of the receptacle, the insert-fit rib being insert-fitted with the slot to retain the insert-joint assembly circumferentially.

The disclosure offers the following advantages:

By providing an insert-joint assembly at the bottom of the column body and providing a receptacle on the foot, the disclosure enables secured fixation between the column body and the foot by insert-fitting the insert-joint assembly into the receptacle, where during the insert-fitting process, the insert-joint assembly creates a push force to compress the elastic snap-fit assembly in the receptacle; and after the insert-joint assembly is mounted in place, the elastic snap-fit assembly will be reset under the action of elastic force, whereby the insert-joint assembly is snap-fitted into the snap groove; fitting between the elastic snap-fit assembly and the snap groove retains the insert-joint assembly from being detached from the receptacle, whereby the column body is secured to the foot, preventing the column body from disengaging from the foot freely. Detachable arrangement between the column body and the foot facilitates packing and transportation; after receiving the package, a user may securely assemble the column body and foot simply by aligning the insert-joint assembly at the bottom of the column body with the receptacle and then insert-fitting the former into the receptacle, which offers a simple, convenient assembly manner and a stable structure; in addition, the reduced assembly difficulty facilitates the user's do-it-yourself (DIY) assembly and improves user experience.

Features and advantages of the disclosure will be described in detail through the preferred embodiments with reference to the accompanying drawings below.

BRIEF DESCRIPTION OF THE DRAWINGS

Hereinafter, the disclosure will be described further through embodiments with reference to the accompanying drawings, in which.

Figure 1:
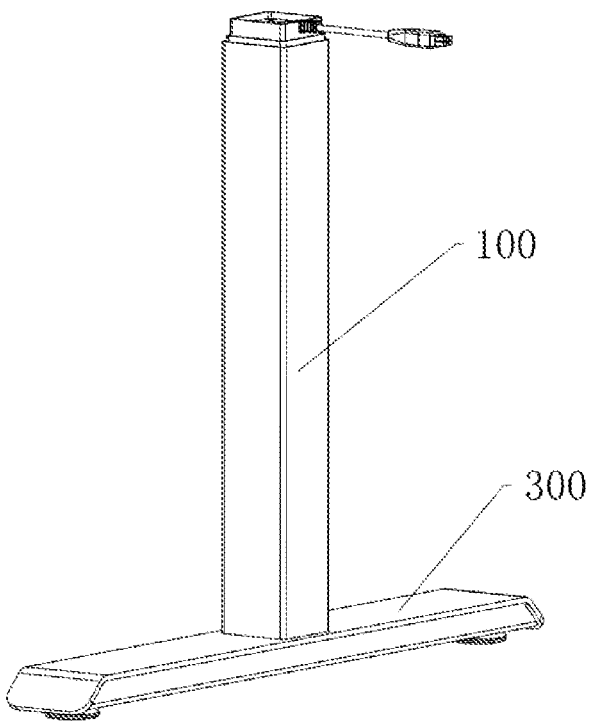
FIG. 1 is a first stereoscopic diagram of a lifting column of the disclosure.
Figure 2:
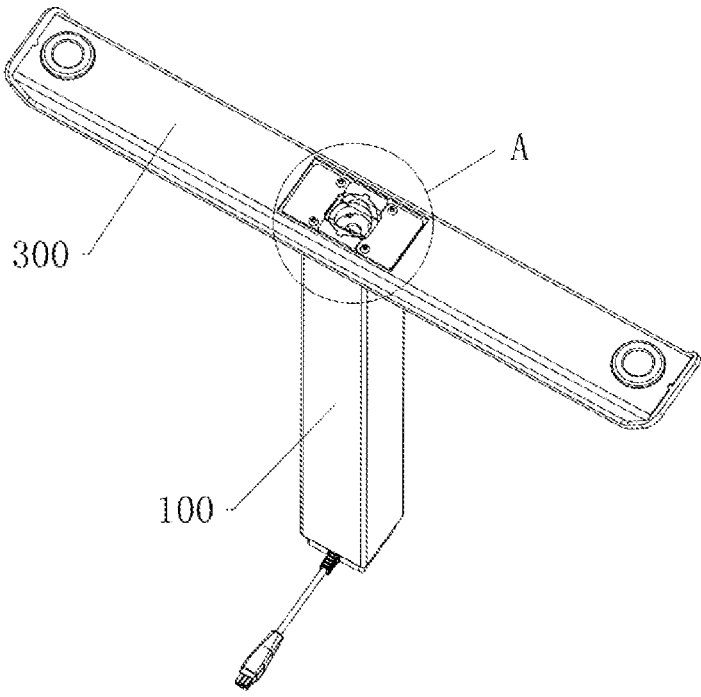
FIG. 2 is a second stereoscopic diagram of the lifting column of the disclosure.

REFERENCE NUMERALS 100. column body;
200. insert-joint assembly; 210. snap hook; 211. snap groove; 212. guide bevel; 220. insert-fit rib; 300. foot; 310. base; 311. accommodation cavity; 320. insert-joint socket; 321. receptacle; 322. slide groove; 323: mounting groove; 324. cover plate; 325. slot;
400. elastic snap-fit assembly; 410. snap-fit rod; 420. elastic member.

DETAILED DESCRIPTION

Embodiments of the disclosure provide a lifting column, comprising a column body and a foot mounted to a lower portion of the column body, an insert-joint assembly being provided at the bottom of the column body, a snap groove being provided on the insert-joint assembly, the foot comprising a base and an insert-joint socket provided on the base, a receptacle configured to receive the insert-joint assembly and an elastic snap-fit assembly disposed at a lower portion of the receptacle being provided on the insert-joint socket, a guide bevel disposed at a lower portion of the snap groove being further provided on the insert-joint assembly, where on insert-fitting between the insert-joint assembly and the receptacle, the elastic snap-fit assembly is compressed by the guide bevel, and after the insert-joint assembly is mounted in place, the elastic snap-fit assembly is snap-fitted in the snap groove to thereby secure the column body to the foot. By providing an insert-joint assembly at the bottom of the column body and providing a receptacle on the foot, the disclosure enables secured fixation between the column body and the foot by insert-fitting the insert-joint assembly into the receptacle, where during the insert-fitting process, the insert-joint assembly creates a push force to compress the elastic snap-fit assembly in the receptacle; and after the insert-joint assembly is mounted in place, the elastic snap-fit assembly will be reset under the action of elastic force, whereby the insert-joint assembly is snap-fitted into the snap groove; fitting between the elastic snap-fit assembly and the snap groove retains the insert-joint assembly from being detached from the receptacle, whereby the column body is secured to the foot, preventing the column body from disengaging from the foot freely. Detachable arrangement between the column body and the foot facilitates packing and transportation; after receiving the package, a user may securely assemble the column body and foot simply by aligning the insert-joint assembly at the bottom of the column body with the receptacle and then insert-fitting the former into the receptacle, which offers a simple, convenient assembly manner and a stable structure; in addition, the reduced assembly difficulty facilitates the user's do-it-yourself (DIY) assembly and improves user experience.

Hereinafter, the technical solutions of the disclosure will be explained and illustrated through embodiments with reference to the accompanying drawings. However, the embodiments are only preferred embodiments of the disclosure, not all of them. Other embodiments derived by those skilled in the art without exercise of inventive work based on the examples in the embodiments all fall within the protection scope of the disclosure.

In the description of the disclosure, it needs to be understood that the orientational or positional relationships indicated by the terms "center," "longitudinal," "transverse," "length," "width," "thickness," "upper," "lower," "front," "rear," "left," "right," "vertical," "horizontal," "top," "bottom," "inner," "clockwise," and "counterclockwise" refer to those orientational and positional relationships illustrated in the drawings, which are intended only for facilitating description of the disclosure and simplifying relevant depictions, but not for indicating or implying that the devices or elements compulsorily possess such specific orientations or are compulsorily configured and operated with the specific orientations; therefore, such terms should not be construed as limitations to the disclosure.

Besides, the terms "first" and "second" are only used for descriptive purposes, which shall not be construed as indicating or implying relative importance or implicitly indicating the number of technical features referred to. Therefore, the features limited by "first" and "second" may explicitly or implicitly include one or more of such features. In the description of the present disclosure, unless otherwise indicated, "plurality" indicates two or above.

In the disclosure, unless otherwise explicitly provided and limited, the terms such as "mount," "connect," "couple," and "fix" should be understood broadly, which, for example, may refer to a fixed connection, a detachable connection, or an integrated connection; which may be a mechanical connection or an electrical connection; which may be a direct connection or an indirect connection via an intermediate medium; which may also be a communication between the insides of two elements. To a person of normal skill in the art, specific meanings of the above terms in the disclosure may be construed based on specific situations.

In the disclosure, unless otherwise explicitly provided and limited, an expression that a first feature is "above" or "below" a second feature may refer to a direct contact between the first feature and the second feature or may refer to a scenario where although the first feature and the second feature do not contact directly, they contact via a further feature therebetween. Moreover, the expression that the first feature is "above" or "over" or "on" the second feature refers to a situation where the first feature is exactly or generally over the second feature or only refers to a situation that the horizontal height of the first feature is higher than the second feature. The expression that the first feature is "under" or "below" or "beneath" the second feature refers to a situation where the first feature is exactly or generally below the second feature or only refers to a situation that the horizontal height of the first feature is lower than the second feature.

Embodiment

A lifting column, as illustrated in FIGS. 1 through 10, comprises a column body 100 and a foot 300 mounted to a lower portion of the column body 100, an insert-joint assembly 200 being provided at the bottom of the column body 100, a snap groove 211 being provided on the insert-joint assembly 200, a receptacle 321 configured to receive the insert-joint assembly 200 and an elastic snap-fit assembly 400 disposed at a lower portion of the receptacle 321 being provided on the foot 300, where on mounting the column body 100 to the foot 300, the insert-joint assembly 200 at the bottom of the column 100 is simply aligned to the receptacle 321 and insert-fitted into the receptacle 321; during the insert-fitting process, the insert-joint assembly 200 creates a push force to compress the elastic snap-fit assembly 400 in the receptacle 321; and after the insert-joint assembly 200 is mounted in place, the elastic snap-fit assembly 400 will be reset under the action of elastic force, whereby the insert-joint assembly 200 is snap-fitted into the snap groove 211; fitting between the elastic snap-fit assembly 400 and the snap groove 211 retains the insert-joint assembly 200 from being detached from the receptacle 321, whereby the column body 100 is secured to the foot 300, preventing the column body 100 from disengaging from the foot 300 freely. In the embodiment, the insert-joint assembly 200 and the column body 100 are preferably detachably connected via a screw such that the insert-joint assembly 200, once damaged, may be independently replaced, whereby maintenance cost is reduced.

By providing an insert-joint assembly 200 at the bottom of the column body 100 and providing a receptacle 321 on the foot 300, the disclosure enables secured fixation between the column body 100 and the foot 300 by insert-fitting the insert-joint assembly 200 into the receptacle 321, where during the insert-fitting process, the insert-joint assembly 200 creates a push force to compress the elastic snap-fit assembly 400 in the receptacle 321; and after the insert-joint assembly 200 is mounted in place, the elastic snap-fit assembly 400 will be reset under the action of elastic force, whereby the insert-joint assembly 200 is snap-fitted into the snap groove 211; fitting between the elastic snap-fit assembly 400 and the snap groove 211 retains the insert-joint assembly 200 from being detached from the receptacle 321, whereby the column body 100 is secured on the foot 300, preventing the column body 100 from escaping from the foot 300 freely. Detachable arrangement between the column body 100 and the foot 300 facilitates packing and transportation; after receiving the package, the user may securely assemble the column body 100 and foot 300 simply by aligning the insert-joint assembly 200 at the bottom of the column body 100 with the receptacle 321 and then insert-fitting the former into the receptacle 321, which offers a simple, convenient assembly and a stable structure; in addition, the reduced assembly difficulty facilitates the user's do-it-yourself (DIY) assembly and improves user experience.

Figure 5:
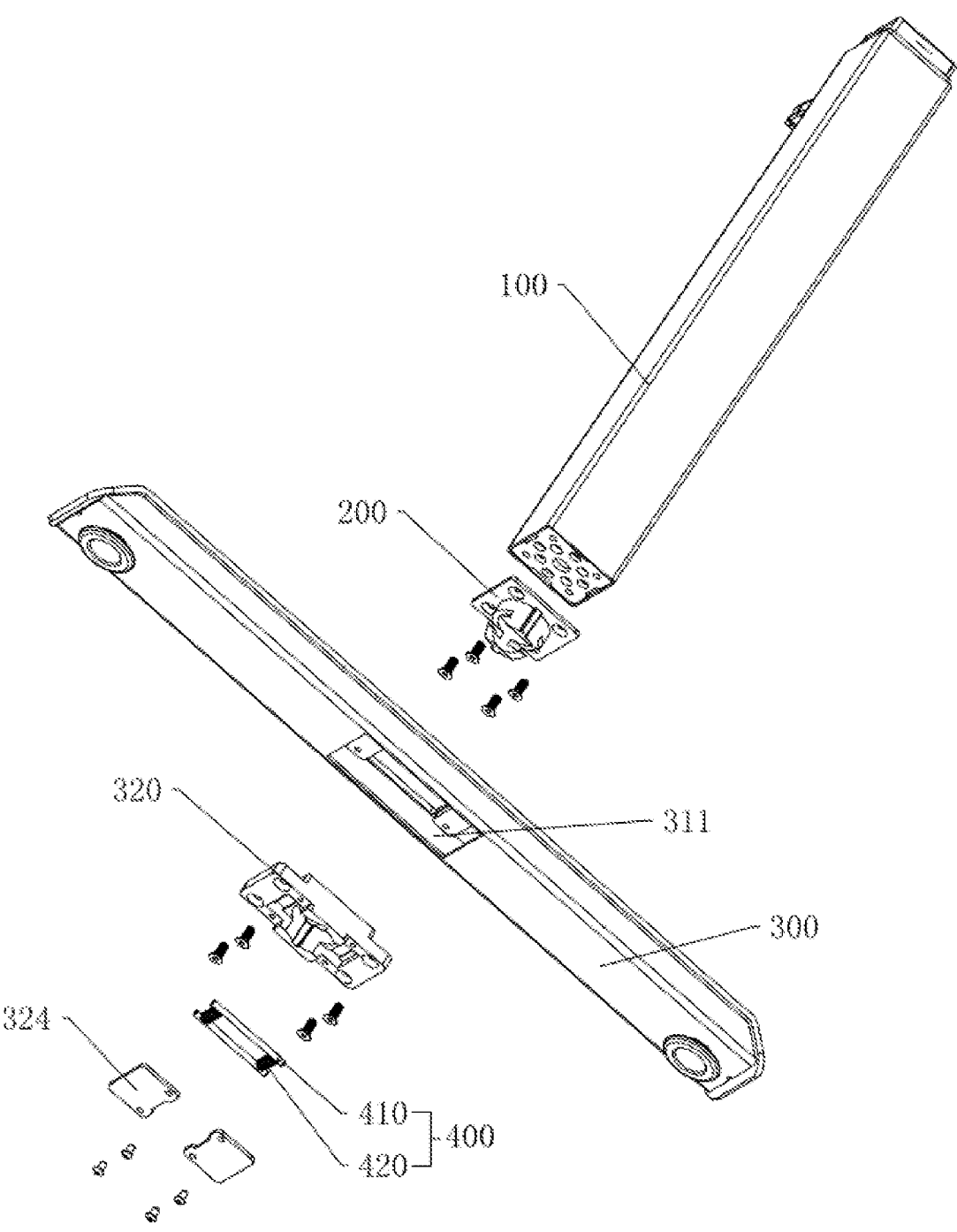
FIG. 5 is an exploded view of the lifting column of the disclosure.
Figure 6:
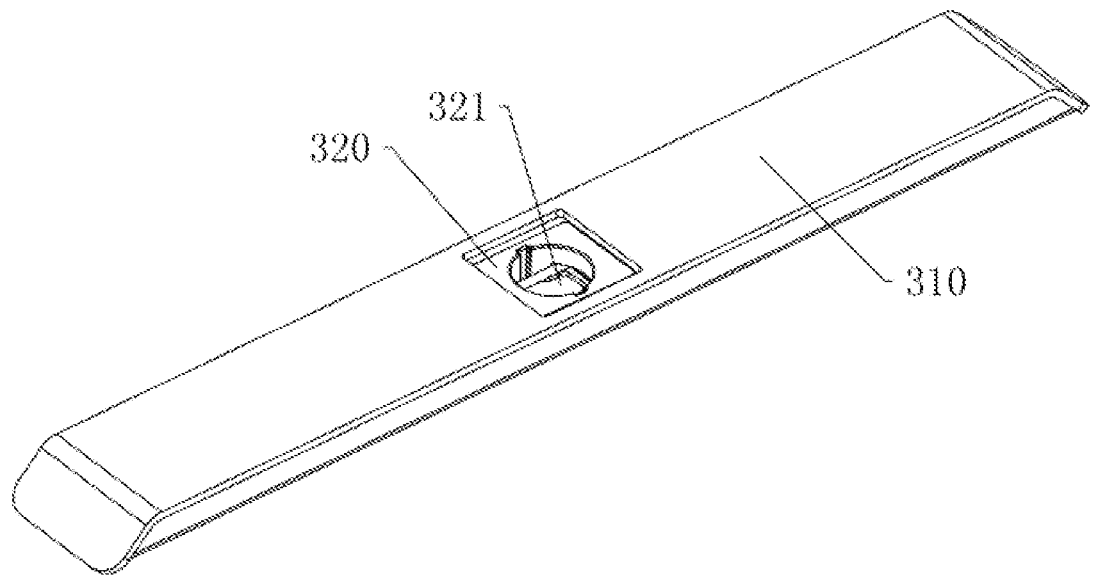
FIG. 6 is a stereoscopic diagram of a foot.
Figure 7:
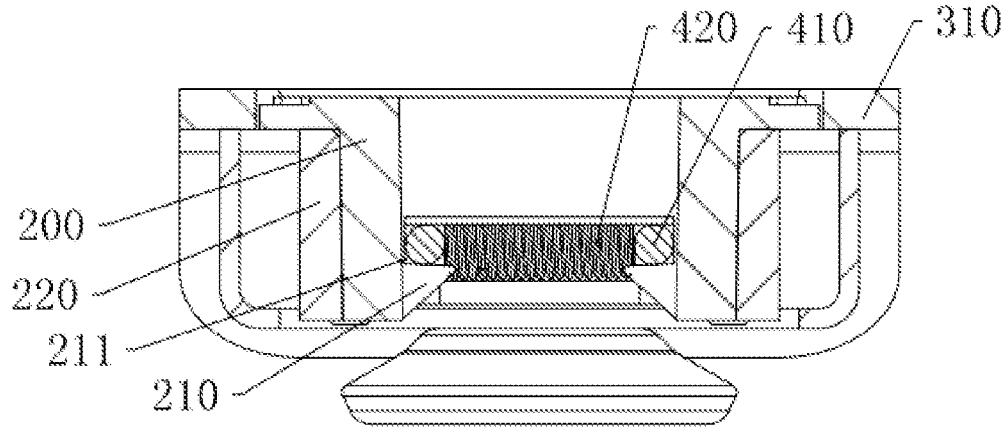
FIG. 7 is a sectional view of the foot.

In this embodiment, as illustrated in FIGS. 5 through 7, the foot 300 comprises a base 310 and an insert-joint socket 320 provided on the base 310, the receptacle 321 and the elastic snap-fit assembly 400 being provided on the insert-joint socket 320, the insert-joint assembly 200 being assembled with the insert-joint socket 320 so as to be secured to the foot 300. By arranging the foot 300 such that the insert-joint socket 320 is split from the base 310, once the elastic snap-fit assembly 400 is damaged, the foot 300 may be repaired by independently replacing the insert-joint socket 320, whereby maintenance cost of the foot 300 is reduced. It is preferable in this embodiment that an accommodation cavity 311 is provided in the base 310, where the insert-joint socket 320 is inlaid in the accommodation cavity 311, rendering a more pleasant appearance to the foot 300.

Figure 4:
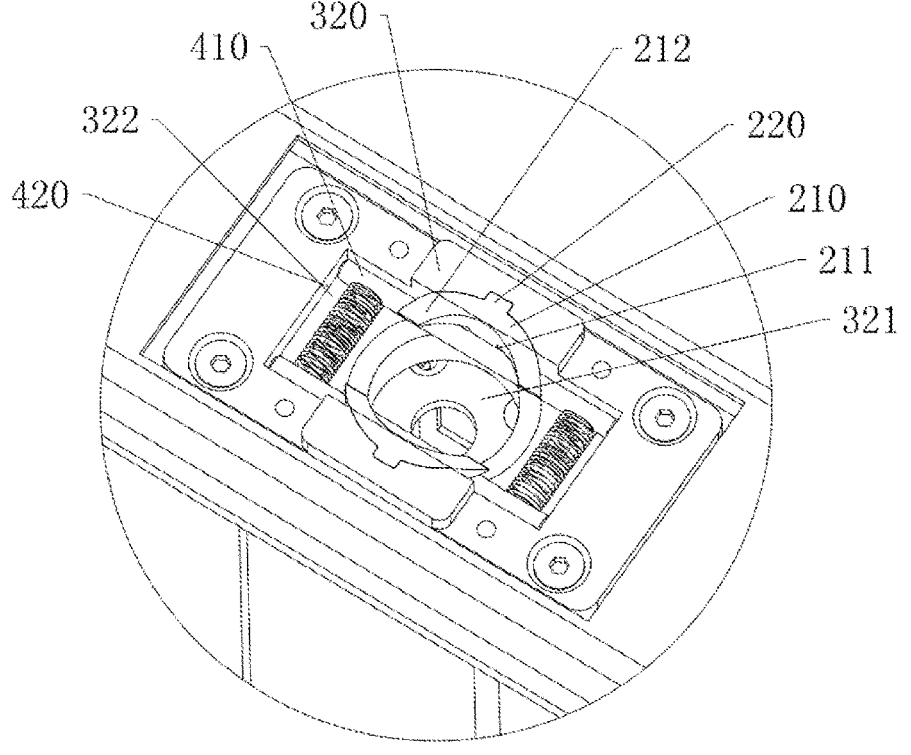
FIG. 4 is a local schematic diagram of an easy-to-assemble foot.
Figure 8:
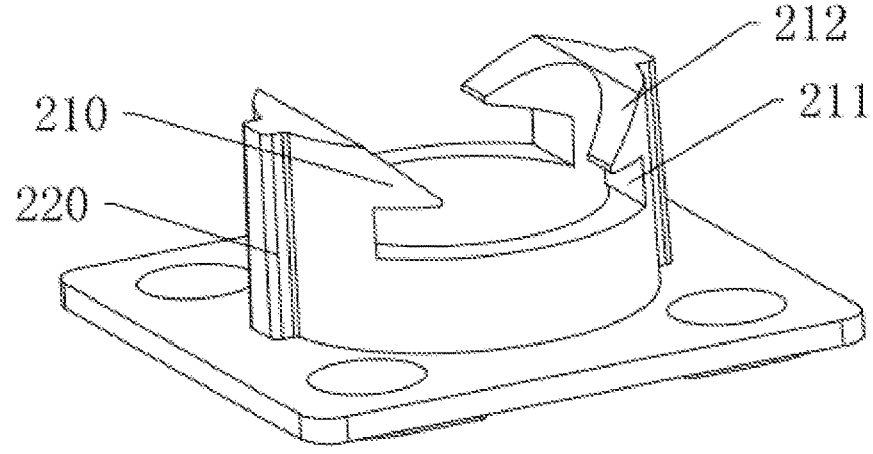
FIG. 8 is a stereoscopic diagram of an insert-joint assembly.
Figure 10:
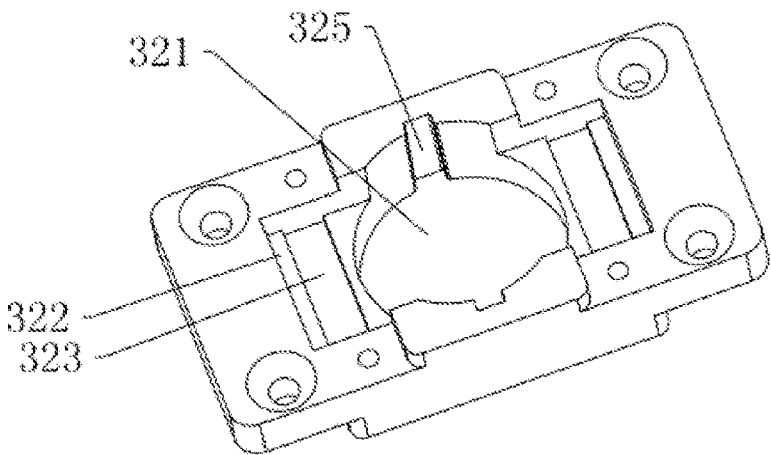
FIG. 10 is a second stereoscopic diagram of the insert-joint socket.

The snap groove 211 may be symmetrically provided at either side of the insert-joint assembly 200, and alternatively, may be provided at one side of the insert-joint assembly 200. Preferably, in this embodiment, as illustrated in FIGS. 4 and 10, a slide groove 322 disposed at either side of the receptacle 321 and communicating with the receptacle 321 is provided at the bottom of the insert-joint socket 320; the elastic snap-fit assembly 400 in this embodiment comprises two snap-fit rods 410 and an elastic member 420 disposed between the two snap-fit rods 410, where a middle portion of each of the two snap-fit rods 410 is disposed in the receptacle 321, and two ends of each of the two snap-fit rods 410 extend into the slide groove 322 at either side of the receptacle 321, and are slidable along the slide groove 322; two elastic members 420 are provided, each elastic member 420 is disposed in either slide groove 322, where two ends of each elastic member 420 abut against the two snap-fit rods 410, respectively; the elastic member 420 is preferably a spring. In this embodiment, in order to quickly mount and position the elastic member 420, a mounting groove 323 is further provided in the slide groove 322, such that on mounting the elastic snap-fit assembly 400 to the insert-joint socket 320, it is only needed to dispose the elastic member 420 into the mounting groove 323; the mounted elastic member 420 is partially disposed in the mounting groove 323 and partially projects out of the mounting groove 323 such that two ends of the elastic member 420 abut against the snap-fit rods 410, whereby assembly efficiency is enhanced. As illustrated in FIG. 8, two snap hooks 210 are provided symmetrically at the bottom of the insert-joint assembly 200, a snap groove 211 being formed on each snap hook 210, where snap grooves 211 are provided at opposite side of the two snap hooks 210, respectively, i.e., the snap grooves are disposed to face the inner side of the insert-joint assembly 200; and a guide bevel 212 inclined toward a corresponding snap groove 211 is provided at the bottom of each snap hook 210.

To mount the insert-joint assembly 200 into the receptacle 321, the guide bevels 212 at the bottom of the snap hooks 210 engage the snap-fit rods 410 and move into the receptacle 321 along with the insert-joint assembly 200, and the snap-fit rods 410 slide towards the elastic member 420 along the guide bevels 212, i.e., the snap hooks 210 push the two snap-fit rods 410 towards the elastic member 420 via the guide bevels 212, where the two snap-fit rods 410 slide towards the elastic member 420 along the slide grooves 322 to compress the elastic member 420 till the insert-joint assembly 200 is mounted in place; at this point, the guide bevels 212 disengage from the snap-fit rods 410 and move till underneath the snap-fit rods 410, and the snap grooves 211 are displaced to the outside of the snap-fit rods 410 to align with the snap-fit rods 410; pushed by the elastic force of the elastic member 420, the snap-fit rods 410 released of external force compression slide towards the snap grooves 211 along the slide grooves 322 and are snap-fitted with the snap hooks 210 via the snap grooves 211, thereby finally realizing tight snap-fitting between the elastic snap-fit member 400 and the insert-joint assembly 200. With provision of the guide bevels 212, this structure enables the snap hooks 210 to automatically compress the elastic snap-fit member 400 when the user pushes the insert-joint assembly 200 to the inside of the receptacle 321, whereby the snap-fit rods 410 mounted in place are automatically snapped into the snap grooves 211; the simple structure saves labor for the user's assembly process and facilitates the user's DIY assembly.

Figure 9:
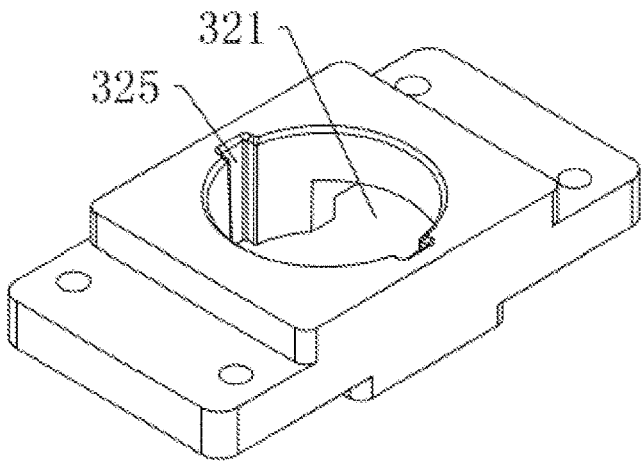
FIG. 9 is a first stereoscopic diagram of an insert-joint socket.

As illustrated in FIGS. 8 and 9, an insert-fit rib 220 is vertically provided on an outer sidewall of the insert-joint assembly 200, and a slot 325 is provided on an inner wall of the receptacle 321, such that when the insert-joint assembly 200 is mounted in place, the insert-fit rib 220 is vertically insert-fitted into the slot 325 so as to retain the insert-joint assembly 200 circumferentially from rotating relative to the receptacle 321, which ensures stability between the column body 100 and the foot 300.

Figure 3:
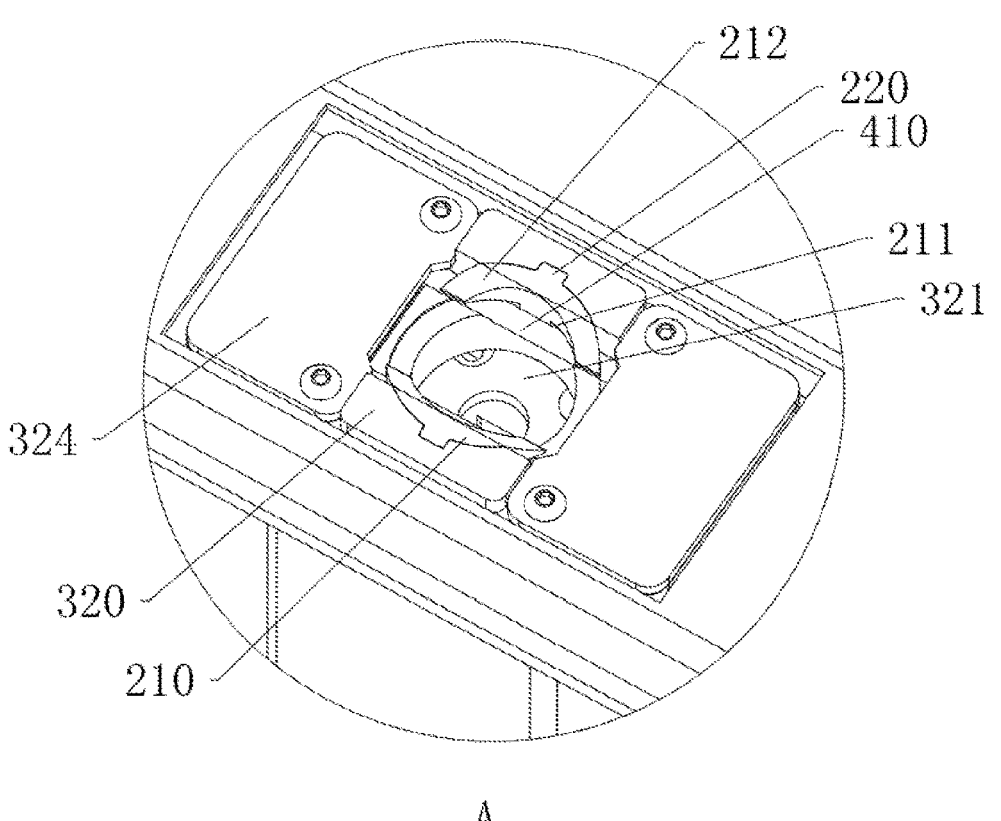
FIG. 3 is an enlarged view of part A of FIG. 2.

As illustrated in FIG. 3, in this embodiment, a cover plate 324 is removably attached onto the insert-joint socket 320. The cover plate 324 is preferably tightly locked to the bottom of the insert-joint socket 320 via a fastener such as a screw, such that the cover plate 324 serves to cover the bottom of the slide groove 322. The cover plate 324 serves to limit the snap-fit rods 410 and the elastic member 420 so as to prevent the snap-fit rod 410 and the elastic member 420 from disengaging from the slide grooves 322 freely, which ensures stability of the connection between the elastic snap-fit assembly 400 and the insert-joint socket 320. The cover plate 324 is movably attached onto the insert-joint socket 320, such that once the elastic snap-fit assembly 400 fails, the cover plate 324 may be removed to facilitate quick, separate replacement of the snap-fit rods 410 and the elastic member 420, which reduces maintenance cost. The cover plate 324 does not block the receptacle 321, such that a tool may access via the bottom of the receptacle 321 to pull the snap-fit rods 410 to disengage from the snap grooves 211, further realizing detachment between the column body 100 and the foot 300, i.e., the user may disassemble the column body 100 from the foot 300 by themselves as needed, which improves user experience.

What have been described above are only preferred embodiments of the disclosure; however, the protection scope of the disclosure is not limited thereto. All technical solutions involved in the concept of the disclosure fall within the scope of protection of the disclosure. A person skilled in the art should understand that any modifications and refinements without departing from the principles of the disclosure will be included within the scope of the claims.

We claim:

1. A lifting column, comprising: a column body and a foot mounted to a lower portion of the column body, wherein an insert-joint assembly is provided at a bottom of the column body, a snap groove is provided on the insert-joint assembly, the foot comprises a base and an insert-joint socket provided on the base, a receptacle configured to receive the insert-joint assembly and an elastic snap-fit assembly disposed at a lower portion of the receptacle are provided on the insert-joint socket, a guide bevel disposed at a lower portion of the snap groove is further provided on the insert-joint assembly, wherein on insert-fitting between the insert-joint assembly and the receptacle, the elastic snap-fit assembly is compressed by the guide bevel, and after the insert-joint assembly is mounted in place, the elastic snap-fit assembly is snap-fitted in the snap groove to thereby secure the column body to the foot; wherein the elastic snap-fit assembly comprises two snap-fit rods slidably attached on the insert-joint socket and an elastic member disposed between the two snap-fit rods, such that after the insert-joint assembly is mounted in place, the snap-fit rods are pushed by the elastic member and snap-fitted into the snap groove.

2. The lifting column according to claim 1, wherein an insert-fit rib is vertically provided on an outer sidewall of the insert-joint assembly, and a slot is provided on an inner wall of the receptacle, the insert-fit rib being insert-fitted with the slot to retain the insert-joint assembly circumferentially.

3. The lifting column according to claim 1, wherein a slide groove disposed at either side of the receptacle and communicating with the receptacle is provided at a bottom of the insert-joint socket, and two ends of each of the snap-fit rods extend into the slide groove so as to abut against the elastic member in the slide groove.

4. The lifting column according to claim 3, wherein a mounting groove is further provided in the slide groove, and the elastic member is partially disposed in the mounting groove.

5. The lifting column according to claim 4, wherein two snap hooks are symmetrically provided at the bottom of the insert-joint assembly, and the snap groove is disposed at either opposite side of the two snap hooks.

6. The lifting column according to claim 3, wherein a cover plate is removably attached onto the insert-joint socket, and the cover plate covers the bottom of the slide groove.

7. The lifting column according to claim 6, wherein two snap hooks are symmetrically provided at the bottom of the insert-joint assembly, and the snap groove is disposed at either opposite side of the two snap hooks.

8. The lifting column according to claim 3, wherein two snap hooks are symmetrically provided at the bottom of the insert-joint assembly, and the snap groove is disposed at either opposite side of the two snap hooks.

* * * * *